March 2, 1965   J. L. HEMERY ETAL   3,171,265
MEANS FOR ICE GLAZING OF FOOD PRODUCTS
Filed March 29, 1962   2 Sheets-Sheet 1
FIG. 1
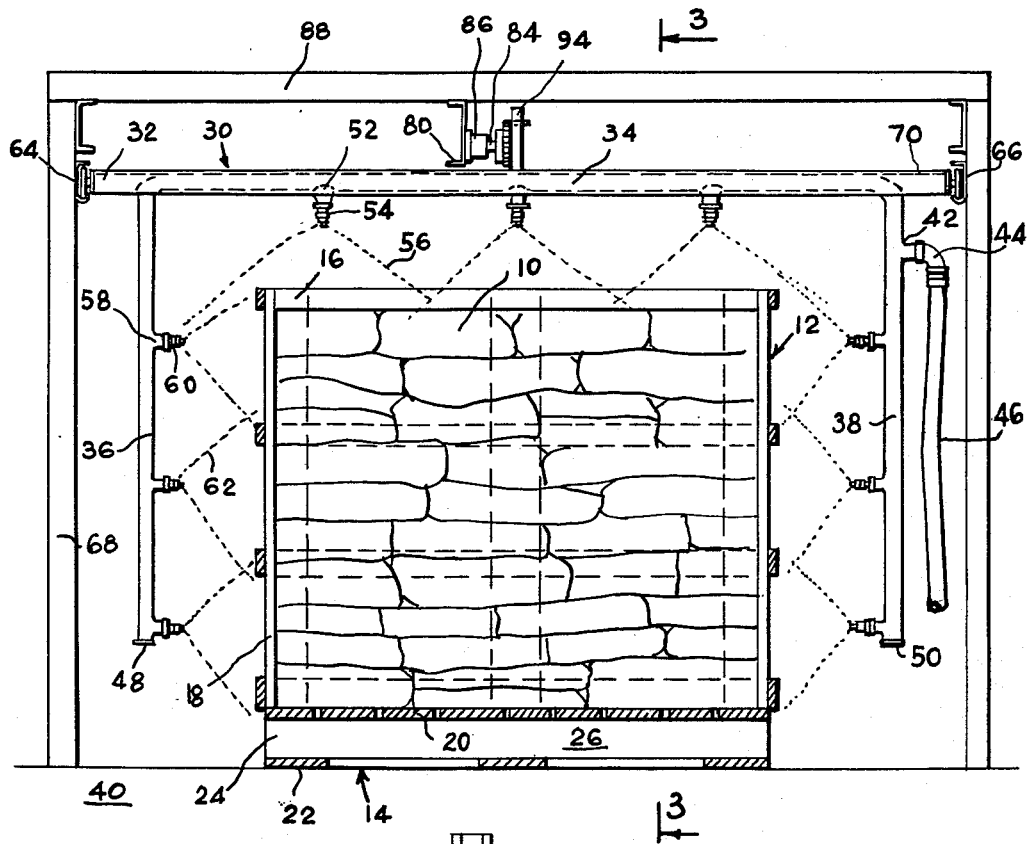
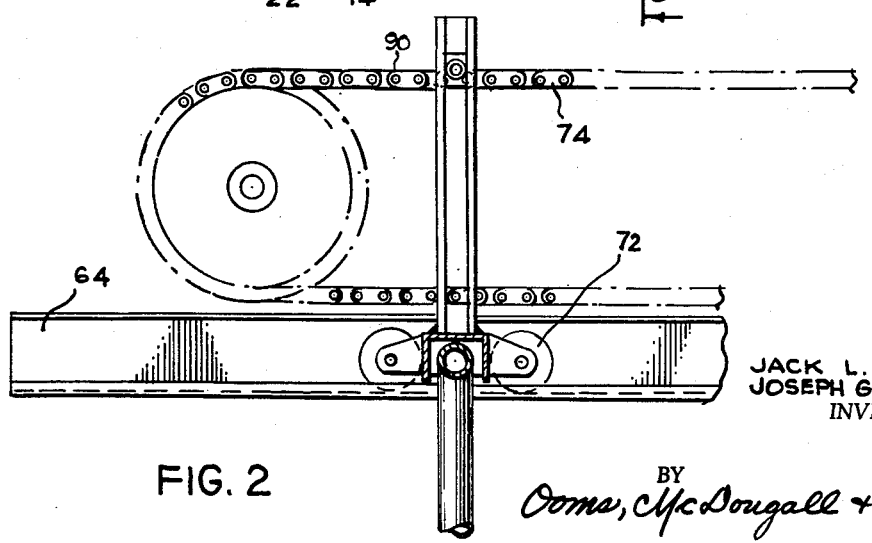
FIG. 2
JACK L. HEMERY
JOSEPH G. FARRELL
INVENTORS
BY Ooms, McDougall & Hersh
ATTORNEYS

JACK L. HEMERY
JOSEPH G. FARRELL
INVENTORS

United States Patent Office 3,171,265
Patented Mar. 2, 1965

3,171,265
MEANS FOR ICE GLAZING OF FOOD PRODUCTS
Jack L. Hemery, Des Plaines, and Joseph G. Farrell, Chicago, Ill., assignors to Continental Freezers of Illinois, Division of F. H. Prince & Co., Inc., Chicago, Ill., a corporation of Delaware
Filed Mar. 29, 1962, Ser. No. 183,478
7 Claims. (Cl. 62—331)

This invention relates to the storage of frozen food products, such as various cuts of meat, poultry, and the like, and relates more particularly to means for the glazing of frozen food products to more or less incapsulate the frozen food products within a relatively thick shell of ice for the purpose of protecting the frozen food products from desiccation, freezer burns, and the like during frozen storage.

Reference is made to the previously issued Patent No. 2,876,109, issued on March 3, 1959, and entitled "Method of Treating Meat Products," wherein the problems sought to be overcome were solved by a system wherein pre-cooled water from an adjacent source is flow-coated by hand onto the exposed surfaces of the frozen food products stacked within a suitable storage crate, whereby the pre-cooled water is intended to congeal upon contact with the stacked food products which have been pre-cooled to sub-freezing temperatures.

While an ice glaze of suitable thickness and coverage is capable of being achieved by the system described in the aforementioned issued patent, there are a number of deficiencies which it is an object of this invention to overcome.

Because of the flow of a substantial stream of water onto the surfaces of the frozen food products, not all of the applied water is capable of congealing immediately to the frozen state. As a result, substantial amounts of free water falls gravitationally from the surfaces of the frozen food products and onto the floor on which the pallet or crate rests, to the extent that the floor and the surrounding media become covered with stalagmites of ice, which are difficult to remove because of the frozen conditions which are required to be maintained in the area in which the process is carried out.

The requirement to maintain sub-freezing temperatures during application of the pre-cooled water introduces additional objections in that it becomes necessary for the operators to work under extremely frigid conditions. This is not only uncomfortable and limiting with respect to the endurance for working under such cold conditions, but a certain amount of applied water ricochets or splashes when directed onto various of the surfaces of the frozen food products, with the result that the operators also become wetted by water which quickly turns to ice.

Further, it is necessary to work with only one pallet or crate of frozen food products at one time, and, in order to achieve adequate production, it becomes necessary to make use of a considerable amount of labor per volume of output.

It is an object of this invention to glaze frozen food products of the type described with protective layers of ice to incapsulate the frozen food products in an ice shell and to make use of a method and means which obviates the objectionable features of the types heretofore pointed out.

More specifically, it is an object of this invention to provide a means of the type described which makes use of a minimum amount of labor; which requires exposure of the operator to a minimum period of time to the cold of the freezing plant; which provides for the reduction, and often the complete elimination, of overflow whereby ice formation on adjacent surfaces is substantially completely avoided; in which more than one pallet or crate of frozen food products can be processed simultaneously, thereby materially to increase the output of glazed frozen food products and in which little, if any, water finds its way onto the clothing of the operator, thereby to avoid the discomforts thereof. It is a related object to provide a means of the type described in which a desirable thick glaze of ice can be formed to encapsulate the crated frozen food products in a simple and efficient manner.

These and other objects and advantages of this invention will hereinafter appear, and, for purposes of illustration, but not of limitation, an embodiment of the invention is shown in the accompanying drawings, in which—

FIGURE 1 is a sectional elevational view taken crosswise of the device embodying the features of this invention;

FIGURE 2 is a sectional elevational view taken lengthwise along about the center of the device shown in FIGURE 1, but with the carrier adjacent the end portion to the left in FIGURE 3;

Figure 3:
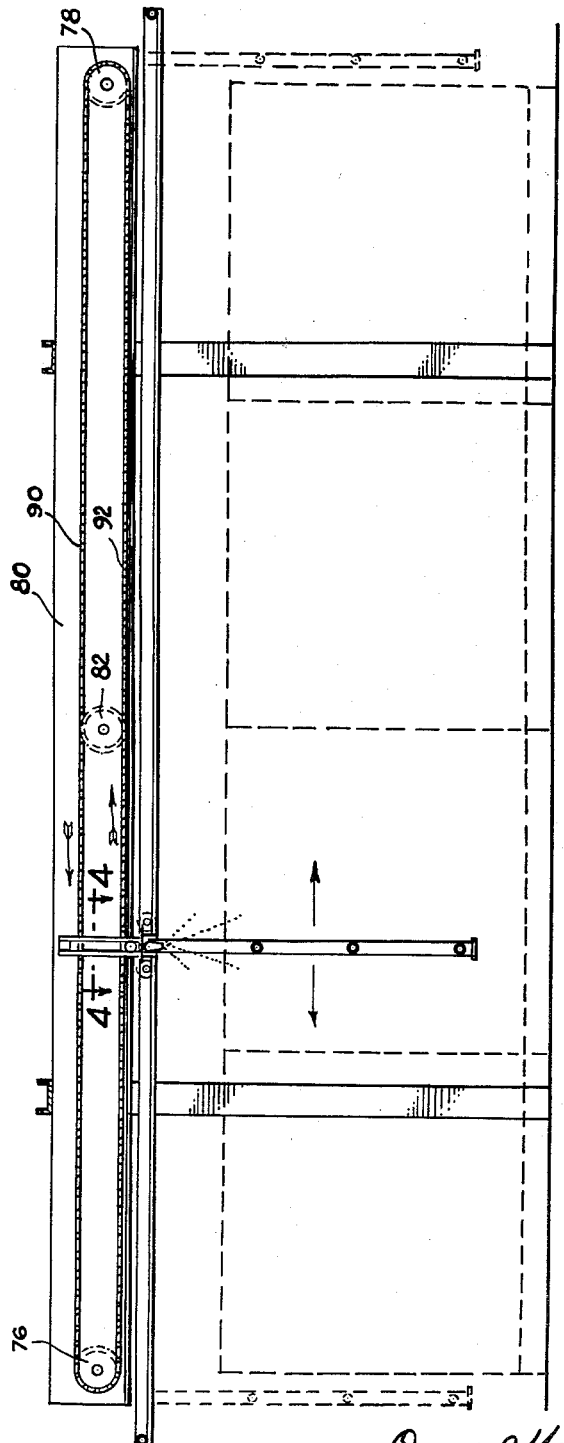
FIGURE 3 is an elevational view of the device taken lengthwise substantially on the line 3—3 of FIG. 1.
Figure 4:
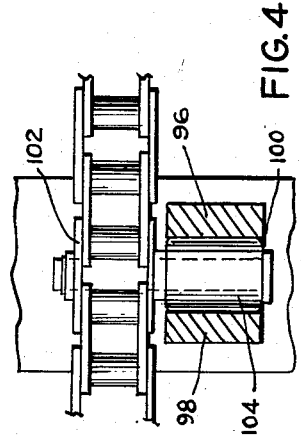
FIGURE 4 is a sectional view taken along the line 4—4 of FIGURE 3.

The invention will be hereinafter described with reference to the processing of freshly cut hams or sides of bacon 10, stacked within wooden crates 12 mounted on pallets 14. The crates are of the type fabricated of a plurality of horizontally disposed wooden strips 16 arranged in vertically spaced-apart relation and fixed at their ends to corner posts 18 to provide a complete open construction for access to the interior thereof through the side and end walls and through the open top. The pallets are of the usual construction having a flat top wall 20 on which the bottom wall of the crate rests and having a bottom wall 22 spaced from the top wall by the interconnecting and intervening side bracing members 24 to provide an open space 26 in between for receipt of the fork of a carrier by which the pallet and the crate positioned thereon are raised and lowered and carried about from station to station. A plurality of such pallets and crates are arranged in end-to-end relation for use in the practice of this invention. In the illustrated modification of FIG. 3, four such crates are shown as arranged in end-to-end relation, but the number can be varied to any extent.

In accordance with the practice of this invention a metal piping 30 in the form of an inverted U is suspended from a suitable carrier 32 to position the cross arm 34 of the piping above the crates while the side arms 36 and 38 will extend downwardly adjacent the lateral walls of the aligned crates but spaced therefrom, and the side arms 36 and 38 are dimensioned to have a length less than the distance between the cross arm 34 and the floor 40, so that the lower ends of the side arms will terminate short of the floor, but they are dimensioned to have a length sufficient to position the lower end portion of the side arms alongside the lower end portion of the crates.

The piping is formed with an inlet 42 having a coupling 44 for connection with a flexible hose or tubing 46 through which water is introduced into the piping from a suitable source. The piping is plugged at its ends 48 and 50. The cross arm 34 is provided with a plurality of longitudinally spaced-apart outlets 52 provided with couplings for attachment of spray heads 54 having their nozzles extending downwardly in the direction to address the spray into the open tops of crates positioned therebeneath. The spray heads 54 are spaced one from the other by an amount which, when calculated with reference to the distance from the top of the crate and the spread of the spray cone, will provide for the mergence of the cones between the adjacent spray heads for complete coverage crosswise of the crates therebeneath, as illustrated by the broken lines 56 in FIG. 1. Similarly, the side arms 36 and 38 are provided with a plurality of vertically spaced-apart outlets 58 fitted with spray heads 60 having nozzles directed inwardly to address the spray laterally into the adjacent sides of the crates with the spaced relation between the nozzles being calculated with reference to the distance from the adjacent side walls of the crate to provide for mergence of the spray cones for complete coverage vertically of the crate, all as illustrated by the broken lines 62 in FIG. 1.

The piping 30 is adapted to be transported in linear movement lengthwise of the aligned crates and to be reciprocated back and forth from one end to the other for complete coverage of the top and side walls of the aligned crates. Water is simultaneously introduced under pressure into the piping for issuance from the spray heads onto the adjacent surfaces of the frozen food products housed within the crates. The amount of water issued from the spray heads and the period for a complete cycle of the piping along the aligned crates and back is calculated to enable the layer of water applied onto the surfaces of the frozen food products to congeal so that little, if any, free water will collect on the surfaces for gravitational flow from the crated frozen food products.

For this purpose, the piping is supported by a carrier 32 which is shiftable longitudinally from one end to the other of the aligned crates and which is provided with means for guiding the carrier in longitudinal movement and other means for actuation of the carrier for reciprocal movement back and forth between the ends of the aligned crates.

Referring now more specifically to the drawings, the guide means as illustrated is a pair of guide rails 64 and 66, which are illustrated in the form of elongated C-shaped beams supported by vertically disposed longitudinally spaced-apart frame members 68 dimensioned to have a length greater than the height of the aligned crate and spaced laterally one from the other by an amount greater than the width of the piping so as to be disposed outwardly thereof and whereby the rails 64 and 66 are positioned above the tops of the crates. The carrier on which the piping is supported comprises an elongate carriage arm 70 which extends crosswise between the rails 64 and 66 and which is provided with longitudinally spaced-apart rollers 72 mounted for free rotational movement on the ends thereof to ride on the rails.

The carriage arm 70 is transported back and forth on the rails by means of an endless chain 74 operatively engaged at its opposite ends about sprockets 76 and 78 mounted for free rotational movement about bearing supports fixed to the end portions of a beam 80 extending lengthwise across the center portion of the frame, whereby the chain sprockets 76 and 78 are positioned adjacent the ends of the aligned crates and slightly inwardly of the ends of the guide tracks 64 and 66. The chain is engaged intermediate the end sprockets by a driving sprocket 82 mounted on the end of a shaft 84 driven by an electrical motor 86 mounted on the center beam 80 and which may also be suspended from an interconnecting cross beam 88. Thus the chain can be driven continuously for travel of the upper run 90 in one direction and return of the lower run 92 in the opposite direction, as indicated by the arrows in FIG. 3. It will be understood that the endless chain may be driven in longitudinal movement by other means such as through one of the end sprockets 76 or 78 and by the other power sources.

Fixed to a central portion of the carrier arm 70 and extending upwardly therefrom alongside the side of the chain 74 opposite the driving motor 86, is an adapter 94 in the form of a pair of longitudinally spaced-apart arms 96 and 98 which define an elongate vertically disposed slot 100 therebetween dimensioned to extend at least between the upper and lower runs of the chain. One of the chain links, indicated by the numeral 102, is provided with a pin 104 extending laterally therefrom into and preferably through said slot 100, whereby the pin, which is dimensioned to have a width less than the width of the slot, is shiftable vertically in said slot. Thus when the pin extends from the upper run 90 of the chain, it will be disposed in the upper portion of the slot to effect displacement of the adapter 94 and the carriage arm 70 with the chain in the one direction and, when the pin extends from the lower run 92, it will be disposed in the lower end portion of the slot to effect displacement of the adapter and carriage arm with the lower run of the chain in the opposite direction.

As the pin 104 travels lengthwise with the top run of the endless chain it is retained in the upper end portion of the slot for concurrent lengthwise displacement of the carriage arm and the piping with it. As the link to which the pin is attached turns about the outer periphery of an end sprocket, the pin is displaced downwardly in the laterally aligned slot in crosswise alignment with the lower run of the chain for continued movement but in the opposite direction.

During travel of the pin, carriage arm 70, and the piping 34 back and forth over the packed crates, water is sprayed from the nozzles 54 downwardly into the open top ends of the crates and onto the frozen food products stacked therein. The spray heads 60 on the side arms 36 and 38 will spray water laterally through the spaces between the slats 16 of the crates into the crevices and the like between the stacked frozen food products substantially completely to coat the frozen food products with a thin layer of water which quickly freezes into an ice layer. As the carrier and the piping is reciprocated back and forth in the manner described the amount of ice builds up on the surfaces of the frozen food products until the desired thickness is achieved. When it is desired to introduce water into the aligned ends of the crates, the crates or pallets can be turned through an angle of 90°, and the operations are repeated to spray water into the end wall portions now extending laterally in the aligned crates until all of the surfaces are glazed with a protective layer of ice of the desired thickness.

It will be apparent from the foregoing that there is provided an automatic means for the uniform application of water onto the frozen food products housed in a plurality of aligned crates, whereby the frozen food products can be encapsulated within a layer of ice of the desirable thickness without requiring constant attention and with a minimum amount of labor; without exposure of the operators continuously to the cold of the freezing chamber or the spray of water; and without the undesirable formation of ice on the flooring about the pallets, which otherwise would interefere with the movement of the pallets.

It will be understood that the device of the type described is flexible, in that it may be fabricated to various lengths, depending upon the number of pallets that it is desired to treat in a single operation, and it will be understood further that a number of such devices may be provided at a single installation, with the pipings arranged to various heights and distances in spaced relation to accommodate crates and pallets of different dimensions.

It will be understood that changes may be made in the details of construction, arrangement, and operation without departing from the spirit of the invention, especially as defined in the following claims.

We claim:

1. A frozen food products glazing apparatus wherein the frozen food is packed within crates having open side, end, and top walls, and wherein said crates are disposed in association with means maintaining sub-freezing temperatures thereabout, said apparatus comprising a rigid piping of interconnected top and side arm members with the side arm members depending downwardly from the end portions of the top arm and spaced one from the other by an amount greater than the crosswise dimension of the crates, spaced nozzles in the top and side arm members for directing the spray outwardly onto the adjacent open top and side walls respectively of the open crates positioned therebetween and with the nozzles spaced one from the other lengthwise of the piping by an amount to enable mergence of the spray cones issuing from said nozzles prior to engagement with the adjacent walls of the crate, means for transporting said piping rectilinearly lengthwise of the crates for travel back and forth between the ends of the crates including a carrier arm extending crosswise above the crates, laterally spaced-apart elongate guide rails dimensioned to have a length corresponding to the length of the aligned crates, an operative connection between the ends of said carrier arm and said guide rails for guiding said arms in linear movement lengthwise of the aligned crates, means for actuating said carrier arm rectilinearly in the guide rails for movement back and forth over the aligned crates and a conduit connecting the piping with a supply of water under pressure whereby water is sprayed from said nozzles through the adjacent open top and side walls of the crates and onto the frozen food products as the piping is carried by the carrier arm back and forth along the length of the aligned crates.

2. An apparatus as claimed in claim 1 in which the cross arm is connected to the carrier arm.

3. A means as claimed in claim 1 in which the means actuating said carrier arm in rectilinear movement comprises an endless chain having a top run and a bottom run extending lengthwise in alignment with the guide rails and an operative connection between said chain and the carrier arm whereby the carrier arm is displaced in one direction by the top run of the chain and in the opposite direction by the bottom run of the chain to transport the carrier arm back and forth along the guide rails.

4. A means as claimed in claim 3 in which the operative connection comprises a member rigid with the carrier arm having a crosswise extending vertically disposed continuous slot in crosswise alignment with the top and bottom runs of the chain, and a pin extending laterally from a portion of the chain into operative engagement with said slot.

5. A means as claimed in claim 4 in which the pin is dimensioned to have a thickness less than the width of the slot to enable sliding movement of the pin vertically through the slot during transfer between top and bottom runs of the chain.

6. An apparatus as claimed in claim 1 wherein the top arm of the piping is dimensioned to have a length greater than the crosswise dimension of the crates, said top arm being positioned at a level above the top walls of the crates, and wherein said sidearms are dimensioned to have a length less than the distance of the top arm from the floor.

7. A frozen food products glazing apparatus wherein the frozen food is packed within crates having open side, end, and top walls, and wherein said crates are disposed in association with means maintaining sub-freezing temperatures thereabout, said apparatus comprising a rigid piping of interconnected top and side arm members with the side arm members depending downwardly from the end portions of the top arm and spaced one from the other by an amount greater than the crosswise dimension of the crates, spaced nozzles in the top and side arm members for directing the spray outwardly onto the adjacent open top and side walls respectively of the open crates positioned therebetween and with the nozzles spaced one from the other lengthwise of the piping by an amount to enable mergence of the spray cones issuing from said nozzles prior to engagement with the adjacent walls of the crate, means for transporting said piping rectilinearly lengthwise of the crates for travel back and forth between the ends of the crates including a carrier arm extending crosswise above the crates, laterally spaced-apart elongate guide rail dimensioned to have a length corresponding to the length of the aligned crates, an operative connection between the ends of said carrier arm and said guide rails for guiding said arms in linear movement lengthwise of the aligned crates, means for actuating said carrier arm rectilinearly in the guide rails for movement back and forth over the aligned crates and conduit connecting the piping with a supply of water under pressure whereby water is sprayed from said nozzles through the adjacent open top and side walls of the crates and onto the frozen food products as the piping is carried by the carrier arm back and forth along the length of the aligned crates, said means actuating said carrier arm in rectilinear movement comprising an endless chain having a top run and a bottom run extending lengthwise in alignment with the guide rails and an operative connection between said chain and the carrier arm whereby the carrier arm is displaced in one direction by the top run of the chain and in the opposite direction by the bottom run of the chain to transport the carrier arm back and forth along the guide rails, said operative connection comprising a member rigid with the carrier arm having a crosswise extending vertically disposed continuous slot in crosswise alignment with the top and bottom runs of the chain, and a pin extending laterally from a portion of the chain into operative engagement with said slot.

References Cited in the file of this patent

UNITED STATES PATENTS

| | | |
|---|---|---|
| 265,675 | Kitsee | Oct. 10, 1882 |
| 2,676,471 | Pierce | Apr. 27, 1954 |
| 2,728,238 | Paasche | Dec. 27, 1955 |
| 2,756,759 | Swain | July 31, 1956 |
| 2,819,594 | Lorie | Jan. 14, 1958 |
| 2,910,993 | Phillips | Nov. 3, 1959 |